United States Patent [19]

Wallin

[11] Patent Number: 5,543,910

[45] Date of Patent: Aug. 6, 1996

[54] PASSIVE SUBMARINE RANGE FINDING DEVICE AND METHOD

[75] Inventor: C. Roger Wallin, Portsmouth, R.I.

[73] Assignee: The United States of America as represented by the Secretary of the Navy, Washington, D.C.

[21] Appl. No.: 358,289

[22] Filed: Dec. 19, 1994

[51] Int. Cl.$^6$ .................................................. G01C 3/10
[52] U.S. Cl. .............. 356/3.14; 356/3.16; 356/7; 114/3.3; 114/340
[58] Field of Search .................. 356/3.13, 3.14, 356/3.15, 3.16, 139.04, 7; 250/206.2, 201.6; 114/340, 313, 312, 339; 348/139; 367/120; 434/26; 359/402

[56] References Cited

U.S. PATENT DOCUMENTS

| | | | |
|---|---|---|---|
| 1,072,393 | 9/1913 | Spear et al. | 114/334 |
| 3,202,040 | 8/1965 | Burkhardt | 356/141.1 |
| 3,256,387 | 6/1966 | Beste | 348/37 |
| 4,341,447 | 7/1982 | Biber | 354/408 |
| 4,591,987 | 5/1986 | Brown | 364/458 |
| 4,848,886 | 7/1989 | Pratt | 359/406 |
| 4,969,735 | 11/1990 | Gilligan | 356/3.14 |
| 5,008,543 | 4/1991 | Bertrand et al. | 250/342 |

*Primary Examiner*—Thomas H. Tarcza
*Assistant Examiner*—Pinchus M. Laufer
*Attorney, Agent, or Firm*—Michael J. McGowan; James M. Kasischke; Prithvi C. Lall

[57] ABSTRACT

A range finding device and method for determining the distance between a submerged submarine and a target above the surface having a first and second periscopes mounted on a submarine with a known separation. These periscopes are rotatable and extensible above the surface and can determine the bearing from each of the periscopes to the target. A computer receives the bearings from the first and second periscopes and uses the bearings with the known preset distance between the periscopes to calculate the distance between the submarine and the target.

9 Claims, 2 Drawing Sheets

PASSIVE SUBMARINE RANGE FINDING DEVICE AND METHOD

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION

1. Field of the Invention

This invention relates generally to an apparatus for passively determining the range of a target from a submerged submarine by using two electronic periscopes.

2. Description of the Prior Art

Range finding is a process in which the distance between an object and an observer is determined. Range finding systems are either active or passive. Active systems typically involve the transmission and reception of electromagnetic energy or acoustic energy. A disadvantage of such active range finding systems is that the transmission of such electromagnetic and acoustic energy discloses the position or location of the transmitting ship.

Existing methods of using a periscope to determine a target's position by passive means are based upon visual observations that produce an accurate measurement of azimuth position but obtain only a rough estimate of target range. The range determination is made by noting how much of the operator's view the target's image fills, as measured by parallel engraved lines on a reticle in the periscope's optical path. Alternately, the range is determined by manipulation of a stadimeter embedded within the periscope. Both techniques are based upon measurement of the vertical angle subtended in the periscope by the target vessel's structure from water line to masthead. If the target's height is known, it can be related mathematically with the vertical angle of observation to yield an estimate of the distance between the submarine and the target.

A key element of this process is knowledge of the target's masthead height which initially requires target type identification. The range measurement thus obtained is only approximate and usually imposes the need to consult a document or data base to obtain the masthead height, following the procedure of target classification. The submarine's periscope may need to be raised and lowered more than once during a time consuming process of identification, height estimation, and measurement. In addition, these range measuring procedures are only effective when the target is a vessel on the ocean surface. Accurate range to an aircraft, such as a hovering helicopter, cannot be measured using the foregoing techniques because the aircraft's height above the surface is difficult or impossible to estimate.

A well known range finding concept is based upon simultaneous observation of a target from two positions where the distance of separation between the two positions is precisely known. The distance between the two observation points or optical windows is used as the base of a triangle. The angle between the baseline and the line of sight to the target is measured with precision from each of the two optical observation points, and a position triangle can be solved through knowledge of two angles and the included side. An accurate determination of range and bearing is made simultaneously, and thus the target's position is defined precisely. The greater the baseline distance, or separation between the observation points, the greater the accuracy of range calculation.

Extension of this concept to a submarine application has not been practical. A traditional submarine periscope is operated from within the control room of the ship by a single individual who turns the scope and observes its optical presentation through the eyepiece. The periscope operator effectively looks through the mast of the periscope; therefore, the periscope must be located within the pressure hull of a submarine. A submarine periscope must be narrow in order to be extended and retracted, thereby permitting only a single optical system to be included within its mast structure. A useful optical range finder requires a substantial horizontal separation between two optical systems that can be focused upon a single object simultaneously. Because of periscope limitations, submarines have not heretofore been able to use horizontal optical separation to achieve range finding capability.

To determine the range from a submarine to a target of unknown height the submarine must make multiple successive observations separated by a measured time interval during transit of the submarine from one position to another. This process, similar to a "running fix" in piloting and navigation terminology, is an attempt to simulate the desired optical separation of a range finder. It is effective only if the target is stationary.

Recent advancements in periscope technology have produced a new type of instrument that will facilitate a significant change in periscope operability. The new periscope is in the form of a remotely controlled, extendable mast, surmounted with a camera or other type of optical imaging device. The periscope operator no longer needs to be in direct contact with the periscope, since the operator observes the periscope sensor's image on an electronic display screen remote from the mast. Accordingly, the periscope mast no longer is required to pass through the control room, and the mast supporting the imaging device can be contained completely outside of the pressure hull, such as in the "sail" structure, or possibly within a ballast tank. In any case, the periscope can be controlled remotely from an operator workstation within the ship.

SUMMARY OF THE INVENTION

Accordingly, it is a general purpose and object of the present invention to provide an apparatus and a method for passively determining the range and bearing of a surface target from a submerged submarine.

It is a further object that such device determine the range to the object accurately without reference to information other than the optical image.

These objects are accomplished with the present invention by providing a range finder for determining the distance between a submerged submarine and a target above the surface having a first periscope and a second periscope mounted with a known separation distance on a submarine. These periscopes are rotatable and extensible above the surface and can determine the bearing from the periscopes to the target. A computer receives the bearings from the first and second periscopes and uses the bearings with the known preset distance between the periscopes to calculate the distance between the submarine and the target.

The advantages of the apparatus and method of this invention are that it provides a wholly passive, yet accurate, means of obtaining range to a surface target from a submerged submarine. It provides the capability of a fire control range finder on a submarine because the ranging apparatus does not require knowledge of the target's physical characteristics (e.g., masthead height). Furthermore, the target localization concept can be applied to air targets as well as to surface vessels, landmarks, or aids to navigation. For example, the invention can be used in piloting to obtain an optical fix of the submarine's position through a single combination sighting of a navigation aid or landmark while the submarine is in motion or at a full stop. As a further advantage, the invention requires little operator action. Range can be determined by either positioning the dual periscopes or electronically superimposing the sensor images on a display.

BRIEF DESCRIPTION OF THE DRAWINGS

A more complete understanding of the invention and many of the attendant advantages thereof will be readily appreciated and better understood by reference to the following detailed description, when considered in conjunction with the accompanying drawings, wherein.

DESCRIPTION OF THE PREFERRED EMBODIMENT

Figure 1:
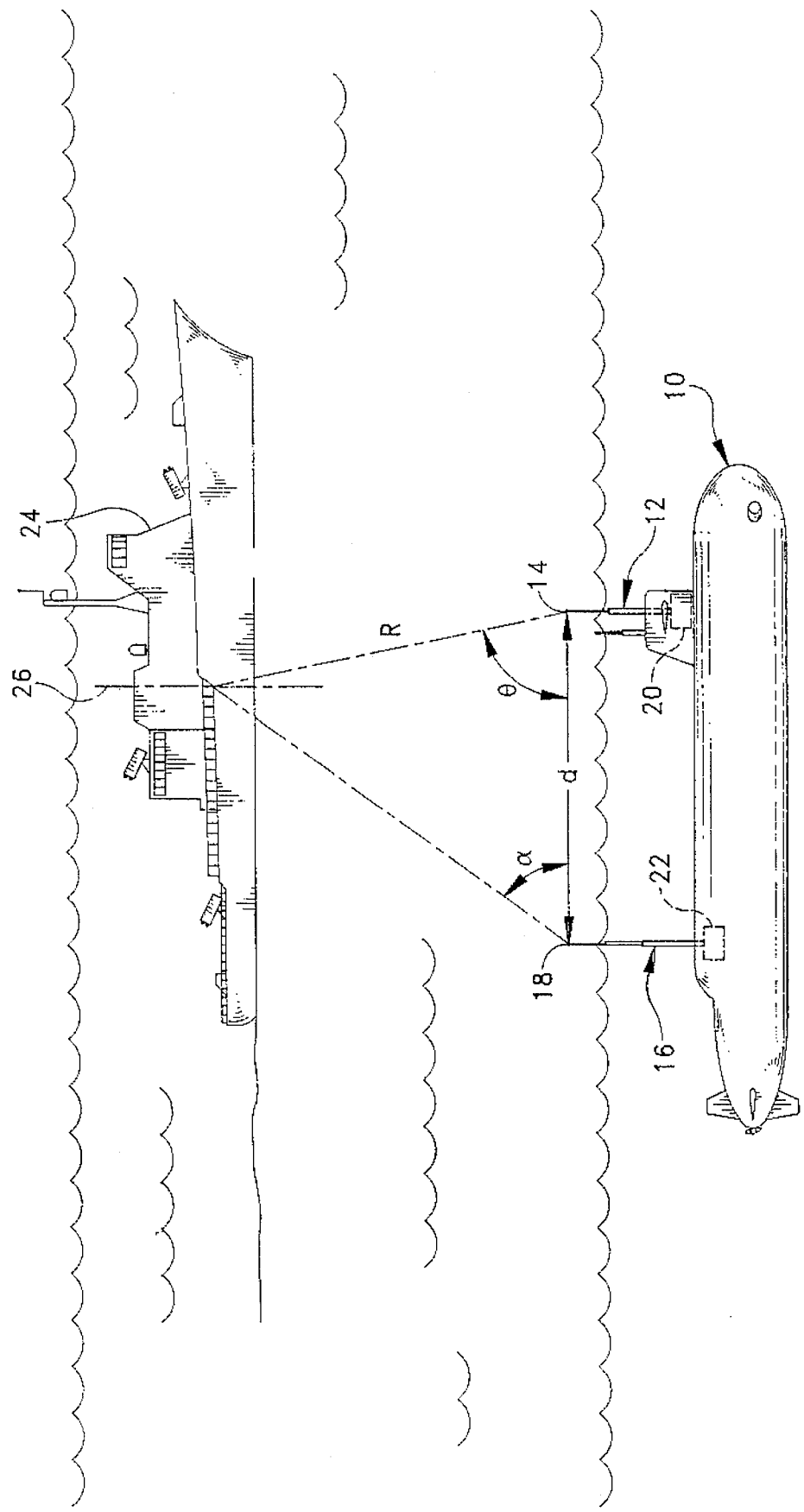
FIG. 1 is a diagram showing the inventive device being used by a submerged submarine to obtain the range to a target.

As shown in FIG. 1, there is a submarine 10 having a forward periscope 12 with a first imaging device 14 disposed at the extremity of periscope 12 and an aft periscope 16 with a second imaging device be disposed at its extremity. Imaging devices 14 and 18 can be charge coupled device cameras, analog video cameras, infrared receivers or the like. Imaging devices 14 and 18 can be rotated in any direction by a first motor 20 and a second motor 22 to face a target 24. Once periscopes 12 and 16 are rotated to face target 24, a bearing θ from the forward periscope 12 to target centerline 26 can be determined. Likewise, a bearing α from aft periscope 16 to target centerline 26 can also be determined. The distance d between forward periscope 12 and aft periscope 16 is a known constant. A range R from submarine 10 to target 24 can be calculated using the law of sines and the included angle law to derive the equation:

$$R = \frac{d\sin(\alpha)}{\sin(\alpha + \theta)} \quad (1)$$

Figure 2:
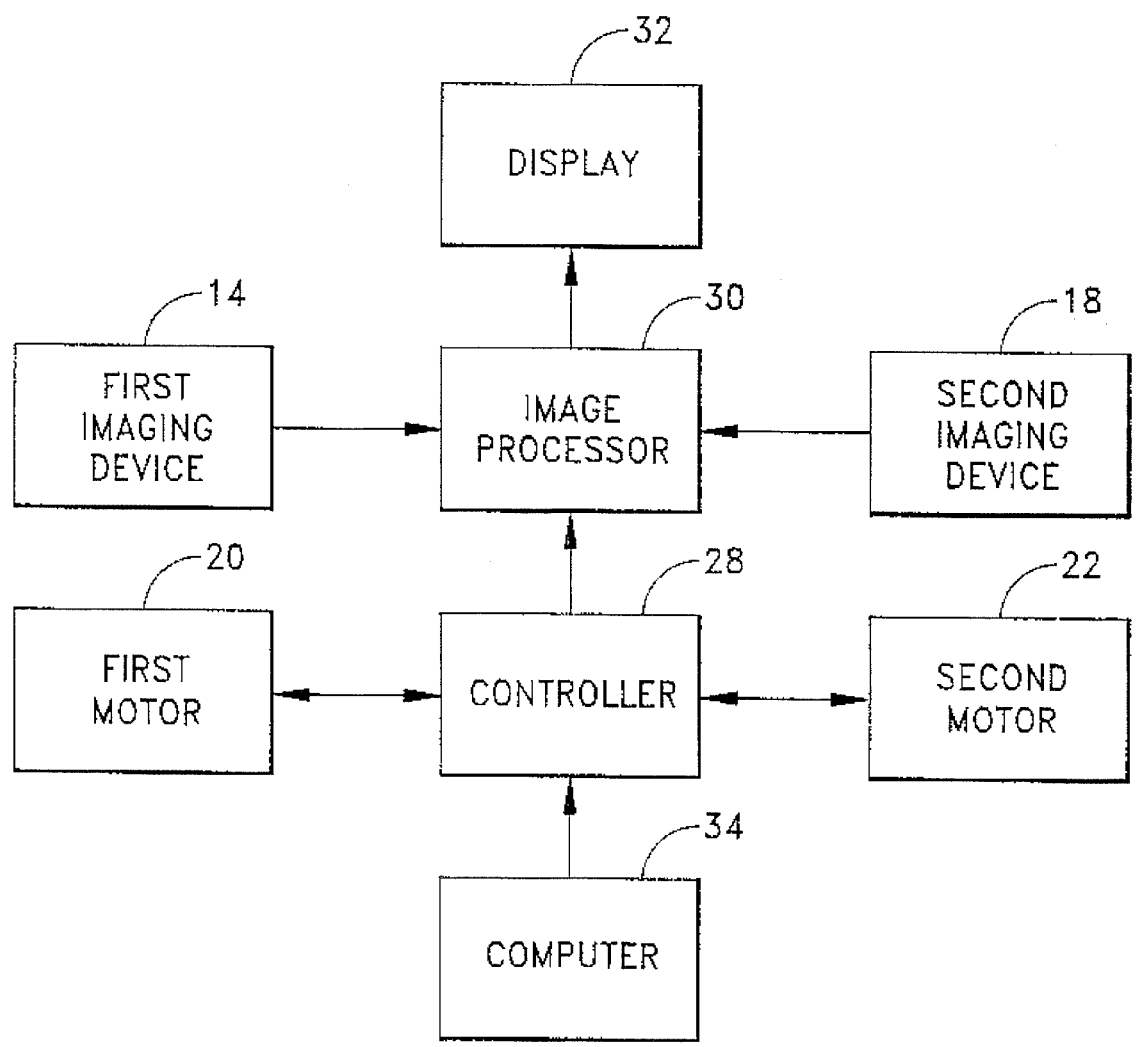
FIG. 2 is a block diagram showing a preferred implementation of the systems of the inventive device.

Referring now to FIG. 2, there is shown a block diagram of the dual periscope range finding system of the current invention. In the diagram, first motor 20 and second motor 22 are electrically connected to a controller 28 to turn imaging devices 14 and 18. First motor 20 and second motor 22 are servo motors or the like to provide precise positional control. A digital or analog position sensing device must be used to measure the rotation of each imaging device 14 and 18. First and second imaging devices 14 and 18 are joined to an image processor 30 to record the image captured by imaging devices 14 and 18. A display 32 is joined to image processor 30 to display a selected image of first imaging device 14, second imaging device 18, or both devices. Controller 28 is joined to a computer 34 to calculate the range to the target by using equation (1), above. Bearings from first imaging device 14 and second imaging device 18 can be converted into angles θ and α respectively. Angles θ and α and the distance between imaging devices, d are used to calculate range R. Bearing information is also available from image processor and, thus, computer 34 can be joined to image processor 30 to allow the range to be calculated from the image processor data.

A preferred method of determining range, R, using the dual periscope invention is to simultaneously raise both periscopes 12 and 16 above the surface. After periscopes 12 and 16 reach the desired height, motors 20 and 22 rotate each imaging device 360° to allow devices 14 and 18 to record an image of the surroundings. Periscopes 12 and 16 are retracted once imaging devices 14 and 18 have completed rotation. A periscope operator can review the recorded image without exposing the submarine to detection. Range, R, to any target 24 can be calculated from the recorded view by using the bearing obtained from forward periscope 12, the bearing obtained from aft periscope 16, and the distance d between periscopes 12 and 16.

Another method of determining range, R, utilizing the current invention is by overlaying the image obtained by the first imaging device 14 with that of the second imaging device 16 in real time. To accomplish this the periscope operator centers the target image from first imaging device 14 in display 32 then centers the target image from second imaging device 18 in display 32. The bearing from each imaging device to the selected target image is transmitted to computer 34, and range R is calculated. The target image can be centered either electronically or mechanically.

The advantages of the present invention over the prior art are that this device can determine the range and bearing of the target from a submarine accurately without reference to information other than optical images. The device can operate quickly without need to compare periscope images with target characteristic tables. Target; identification is unnecessary. Also a submarine no longer needs to use the running fix method to determine the range to a navigation aid.

What has thus been described is a range finder for determining the distance between a submerged submarine and a target above the surface having a first and second extensible periscopes mounted on a submarine with a known separation. These periscopes are rotatable and extensible above the surface and can determine the bearing from the periscopes to the target. A computer receives the bearings from the first and second periscopes and uses the bearings with the known preset distance between the periscopes to calculate the distance between the submarine and a target.

Obviously many modifications and variations of the present invention may become apparent in light of the above teachings. For example: the first and second motors can be joined either to rotate the entire mast or to rotate only the imaging device; the motors can be positioned on the extremity of the mast; the imaging devices can be charge coupled device cameras; the periscopes can have additional equipment to allow the imaging devices to be tilted to observe aircraft; and the periscopes can be positioned anywhere on the submarine.

In light of the above, it is therefore understood that within the scope of the appended claims, the invention may be practiced otherwise than as specifically described.

What is claimed is:

1. A range finder for determining the distance between a submerged submarine and a target above the surface comprising:

a first periscope mounted on said submarine, said first periscope being rotatable and extensible above the surface and having means for determining a first bearing from said first periscope to said target;

a second periscope mounted on said submarine at a preset distance from said first periscope, said periscope being rotatable and extensible above the surface and having means for determining a second bearing from said second periscope to said target, said second periscope being capable of being raised simultaneously with said first periscope; and a computer receiving said first bearing from said first periscope and said second bearing from said second periscope and using said first and second bearings with said preset distance between said first and second periscopes to calculate the range from said submarine to said target.

2. The range finder of claim 1 wherein said first periscope comprises:

a first extensible mast having a base mounted on said submarine and an extensible end extensible above the surface; and a first electronic imaging device disposed on said extensible end of said first extensible mast.

3. The range finder of claim 2 wherein said second periscope comprises:

a second extensible mast having a base mounted on said submarine and an extensible end extensible above the surface; and a second electronic imaging device disposed on said extensible end of said second extensible mast.

4. The range finder of claim 3 further comprising:

at least one display connected to said first and second electronic imaging devices for displaying the images from said first and second electronic imaging devices; and a controller joined to each said periscope to allow rotation of said imaging devices to determine the bearing from each said imaging device to said target, said bearings being provided to said computer for determination of the range from said submarine to said target.

5. The range finder of claim 3 further comprising an image processor electrically connected to said first and second imaging devices and to said computer for superimposing the images received from said imaging devices and determining the bearing between said target and said first imaging device and the bearing between said target and said second imaging device to said computer.

6. A range finding method from a submerged submarine comprising the steps of:

raising a first periscope above the surface to obtain a first image of a target;

raising a second periscope positioned at a preset distance from said first periscope above the surface to obtain a second image of said target, said second periscope being raised simultaneously with said first periscope;

determining the bearing from said first periscope to a target optically;

determining the bearing of said second periscope to said target optically; and calculating the range from said submarine to said target using the determined bearings from said first periscope, said second periscope, and the distance between said first and second periscopes.

7. The range finding method of claim 6 further comprising the steps of:

rotating said first raised periscope;

recording images obtained from said first raised periscope electronically;

rotating said second raised periscope;

recording images obtained from said second raised periscope electronically;

lowering said first raised periscope after images are recorded; and lowering said second raised periscope after images are recorded.

8. The range finding method of claim 7 wherein the steps of determining a bearing comprise the steps of:

displaying said recorded image from said first periscope;

centering said recorded image of said target from said first periscope to determine a first bearing;

displaying said recorded image from said second periscope; and centering said recorded image of said target from said second periscope to determine a second bearing.

9. The range finding method of claim 6 wherein the steps of determining a bearing comprise the steps of:

displaying said first image from said first raised periscope;

centering said first image of said target from said first raised periscope to determine a first bearing;

displaying said second image from said second raised periscope; and centering said second image of said target from said second raised periscope to determine a second bearing.

* * * * *